US011634594B2

United States Patent
Baricos et al.

(10) Patent No.: US 11,634,594 B2
(45) Date of Patent: *Apr. 25, 2023

(54) ANTIMICROBIAL AGENT FOR COATINGS AND FINISHES

(71) Applicant: SWIMC LLC, Cleveland, OH (US)

(72) Inventors: Cynthia D. Baricos, Skokie, IL (US); Jacob S. Donlon, Louisville, KY (US); Victoria J. Gelling, Minneapolis, MN (US)

(73) Assignee: SWIMC LLC, Cleveland, OH (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/347,449

(22) PCT Filed: Oct. 25, 2017

(86) PCT No.: PCT/US2017/058211
§ 371 (c)(1),
(2) Date: May 3, 2019

(87) PCT Pub. No.: WO2018/085085
PCT Pub. Date: May 11, 2018

(65) Prior Publication Data
US 2019/0276680 A1    Sep. 12, 2019

Related U.S. Application Data

(60) Provisional application No. 62/417,193, filed on Nov. 3, 2016.

(51) Int. Cl.
| C09D 5/14 | (2006.01) |
| C09J 11/04 | (2006.01) |
| A01N 59/16 | (2006.01) |
| C08K 3/11 | (2018.01) |
| C08K 3/22 | (2006.01) |

(52) U.S. Cl.
CPC .............. C09D 5/14 (2013.01); A01N 59/16 (2013.01); C08K 3/11 (2018.01); C09J 11/04 (2013.01); C08K 3/22 (2013.01); C08K 2003/2227 (2013.01)

(58) Field of Classification Search
CPC .............. C09J 11/04; C09D 5/14; C08K 3/11; C08K 3/22; C08K 2003/2227; A01N 59/16; A01N 25/02; A01N 25/08; A01N 25/30; A01N 59/06
See application file for complete search history.

(56) References Cited

U.S. PATENT DOCUMENTS

| 5,049,677 A | 9/1991 | Prout et al. |
| 5,413,789 A | 5/1995 | Hagiwara et al. |
| 5,658,956 A | 8/1997 | Martin et al. |
| 2005/0234149 A1 | 10/2005 | Heinz et al. |
| 2009/0306218 A1 * | 12/2009 | Fitzgerald .............. A61K 8/355 514/690 |
| 2012/0078155 A1 | 3/2012 | Bowman et al. |
| 2013/0266629 A1 | 10/2013 | Arvidsson |
| 2018/0105700 A1 * | 4/2018 | Mistry ..................... C09D 7/65 |

FOREIGN PATENT DOCUMENTS

| CN | 104559876 A | 4/2015 |
| GB | 2482400 A | 1/2012 |
| JP | S62-70221 A | 3/1987 |
| JP | H03-252308 A | 11/1991 |
| JP | 2001-501576 A | 2/2001 |
| WO | 2008035085 A1 | 3/2008 |
| WO | 2015/165994 A2 | 11/2015 |
| WO | 2016/130656 A1 | 8/2016 |
| WO | 2016/161387 A1 | 10/2016 |
| WO | 2016/187618 A1 | 11/2016 |
| WO | WO-2016187617 A1 * | 11/2016 ............. A01N 59/06 |

OTHER PUBLICATIONS

Extended European Search Report for Application No. 17867592.2, dated Jul. 1, 2020.
International Search Report and Written Opinion from International Application No. PCT/US2017/058211, dated Mar. 1, 2018.

* cited by examiner

Primary Examiner — Angela C Scott

(57) ABSTRACT

A microbe-resistant coating, coating intermediate, finish, finish intermediate, or colorant that includes an antimicrobial agent. The antimicrobial agent is an inorganic bismuth-containing compound, and may be used in conjunction with other bismuth-containing compounds or other biocidal agents or methods. The bismuth-containing compound may also be used to impart micro-resistance to a coating, coating intermediate, finish, finish intermediate, colorant, processing equipment or vessels.

14 Claims, No Drawings

ANTIMICROBIAL AGENT FOR COATINGS AND FINISHES

CROSS REFERENCE TO RELATED APPLICATION

This application is a National Stage Application of PCT/US2017/058211, filed 25 Oct. 2017, which claims the benefit of U.S. Provisional Application No. 62/417,193 filed on 3 Nov. 2016, both of which are incorporated herein by reference in their entirety.

BACKGROUND OF THE INVENTION

Matrices in either wet or semi-solid forms are often used to create coatings, paints, varnishes, pastes, lotions, gels or the like. The matrices have a broad range of applications for commercial uses. However, the manufacturing environment of the matrices and potentially their storage conditions may introduce microorganisms or permit the growth of microorganisms. The growth of microorganisms can adversely affect the application and use of the matrices. As a result, conventional biocides are often incorporated into matrices in order to prevent or eliminate the growth of microorganisms.

The use of conventional biocides can raise certain health or safety concerns. Many of the biocides that are available for applications in wet or semi-solid matrices often employ materials that are allergenic, create potential health hazards, contain volatile organic compounds (VOC), or are potentially toxic. For example, one conventional biocide is isothiazoline. Under European classification and labelling standards, products incorporating isothiazoline are required to include a warning on the label indicating that contact with the product incorporating the biocide may produce an allergic reaction. Additionally, the handling of larger concentrated quantities of isothiazoline, such as in the large scale production of matrices, has led to stringent warnings regarding potential health hazards.

From the foregoing, it will be appreciated that what is needed in the art is an effective biocide for matrices that can be readily included in various formulations, is environmentally friendly, is entirely safe to humans and has low toxicity. Such a biocide that can be used in a variety of matrices is disclosed and claimed herein.

SUMMARY

The present description provides an antimicrobial agent to impart microbe-resistant properties or characteristics to a locus. The microbe-resistant composition may be applied to a locus to function as a sanitizer or a preservative. For purposes of this disclosure, locus is referring to a site, place, location, object, material, equipment or process susceptible to the growth of microorganisms. In certain embodiments, the locus may be a coating, a coating intermediate, a finish, a finish intermediate, colorant, process equipment, a storage vessel, or any combination thereof. An effective amount of the anti-microbial agent may be employed with or at the locus for the prevention, reduction or elimination of microbial growth or contamination.

In an embodiment, a method of treating a locus includes providing an effective amount of at least one antimicrobial agent including at least an inorganic bismuth-containing compound, and adding the antimicrobial agent to at least a part or portion of the locus to impart microbe-resistance.

In yet another embodiment, a composition for preventing, reducing or eliminating microbes in a locus may be used. The composition has an effective amount of at least one antimicrobial agent including at least an inorganic bismuth-containing compound to eliminate microbial contamination in a locus.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description, and from the claims.

Selected Definitions

Unless otherwise specified, the following terms as used herein have the meanings provided below.

The term "antimicrobial agent" refers to a compound or component that kills microorganisms or inhibits their growth. A microorganism in this context can be any microbe or microscopic organism, including for example, a bacterium, a fungus, or a virus. As used herein, the term "antimicrobial" includes compounds or components regarded as being "antibacterial" or "antifungal."

The term "binder resin" means a natural or synthetic polymer suitable for use in coating and finish compositions to form dried, cured or otherwise hardened coatings or films in which the binder may represent a continuous phase.

The term "carrier" means a volatile aqueous (waterborne) or organic liquid solvent or dispersant (solvent-borne) that can be used to prepare paints and other coating compositions containing suspended pigments and other suspended solid particulate materials.

The terms "coating" and "finish" generally refer to a composition that is applied onto a substrate as a protective layer, an aesthetic layer or both and may increase the durability or extend the useful life of the resulting product.

The term "colorant" refers to a composition that may be added to a base coating composition (e.g., a base paint or stain) so as to alter the hue or color of such base coating composition, and which typically and preferably is substantially free of high molecular weight film-forming polymeric binders like those normally used in paints and other coating compositions.

The term "component" refers to any compound that includes a particular feature or structure. Examples of components include compounds, monomers, oligomers, polymers, and organic groups contained therein.

The term "comprises" and variations thereof do not have a limiting meaning where these terms appear in the description and claims.

The term "concentrate" means a composition that may be used in a factory as an intermediate from which is made fluid colorants for use in point-of-sale dispensing equipment, or from which is made premixed pre-tinted fluid coating compositions, and which contains the disclosed solid pigment particles, the disclosed reactive liquid carrier and if needed pigment wetting or dispersing agent.

The term "dispersion" when used with respect to a locus contains particles uniformly distributed in a continuous liquid phase.

The term "effective amount" when used in connection with an antimicrobial agent refers to an amount sufficient to at least adversely affect the growth of microbes and may include, the complete killing, eradication, arresting of growth, inhibition, or a reduction in number of microbes.

The term "film forming" when used in reference to a polymeric binder means that a solution or dispersion of the polymeric binder can be coated in a thin wet layer (e.g., of about 150-200 μm thickness) on a suitable support, and dried, cured or otherwise hardened (if need be with the aid of a suitable coalescent) to form over the support a substantially continuous dry film coating layer (e.g., of about 75-100 μm thickness) containing the polymer.

The term "intermediate" means a composition or product that is suitable for further processing or combination with another composition to create a final product.

The term "locus," is referring to a site, place, location, object, material, equipment or process susceptible to the growth of microorganisms. "Loci" refers to more than one locus.

As used herein, the term "microbe-resistance" means a composition that includes an effective amount of an antimicrobial agent to produce a biostatic effect (e.g. reduce microbial contamination by at least one standard rating according to the scoring scale in ASTM D 2574) or even a biocidal effect (e.g. eliminate microbial contamination) and may include for example, the complete killing, eradication, arresting in growth, inhibition, or a reduction in number of microbes. A reduction or elimination of microbial contamination can occur (i) on or at a locus already exhibiting microbial growth or contamination, or (ii) on or at a locus with potential for supporting microbial growth or contamination.

The term "pigment" means a natural or synthetic particulate material having light-reflective or light-absorptive characteristics and a surface energy and particle size suitable for use in coloring paints and other coating compositions, and will be construed to include both insoluble materials such as inorganic or organic powdered pigments, and soluble materials such as organic dyes.

The term "point-of-sale" means a site at which custom-mixed coating compositions are tinted and mixed in small batch lots (e.g., one half pint, one pint, one quart, one liter, one gallon, four liter, five gallon or 20 liter containers, corresponding to containers from about 0.2 to 20 L) for sale to end users (e.g., painters, builders and homeowners). Representative point-of-sale outlets include retail paint stores, mobile retail vehicles, hardware stores, building supply stores (including warehouses), and distribution centers.

Unless otherwise indicated, the term "polymer" includes both homopolymers and copolymers (i.e., polymers of two or more different monomers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

A "stable dispersion" refers to a dispersion that does not undergo visibly detectable phase separation if allowed to stand undisturbed in a clear mixing vessel at room temperature for at least eight hours.

The term "substantially free" means that the locus contains less than 1,000 parts per million (ppm) of the recited compound. The term "essentially free" when used with respect to a locus means that the locus contains less than 100 parts per million (ppm) of the recited mobile compound.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 1 to 2, etc.).

DETAILED DESCRIPTION

The present description provides a microbe-resistant composition and a method for introducing an antimicrobial agent to a locus to impart microbe-resistance to it. Certain embodiments of compositions may include, for example, a coating, coating intermediate, finish, finish intermediate or a colorant. Alternatively, the composition may be utilized to completely kill, eradicate, arrest growth, inhibit, or reduce in number microbes present in process equipment or storage vessels.

In one aspect, the locus may include a wide spectrum of compositions suitable in coating, finish or colorant applications. For example, the composition may be any type of organic, inorganic, or hybrid coating, coating intermediate, finish, finish intermediate, or colorant. An effective amount of at least one antimicrobial agent may be introduced to the locus. In some embodiments, the locus may be a liquid, solid, paste, dispersion or solution that is capable of accepting the anti-microbial agent. Process equipment utilized in the formation or manufacturing of products such as coatings, coating intermediates, finishes, finish intermediates, and colorants may also be treated with the an effective amount of at least one antimicrobial agent. Additionally, storage vessels holding various loci may also be treated with the antimicrobial agent to prevent formation of microbial colonies or to reduce or eliminate microbial colonies, if already present. Non-limiting examples of process equipment include tanks, pumps, piping, mixers and the like that may be utilized to produce coatings, finishes, colorants, or their intermediates. Non-limiting examples of storage vessels include any container, can, tube or bottle.

Accordingly, in one embodiment, the present description provides an inorganic bismuth-containing antimicrobial agent, for preventing, reducing or eliminating microbial contamination or growth in a locus. The antimicrobial agent is preferably present in an amount sufficient to at least prevent microbes from colonizing, or if microbial colonies are present upon the introduction or use of the antimicrobial agent, to reduce the amount of microbial colonies. In certain applications where microbial colonies are present, the colonies may be reduced as indicated by an improvement in at least one standard rating according to ASTM D 2574, preferably at least a "1" rating according to ASTM D 2574 and most preferably a "0" rating according to ASTM D 2574. A variety of such antimicrobial agents may be employed. Specific inorganic bismuth-containing antimicrobial agents may be selected based upon, for example, the microorganism(s) to be treated; the physical and chemical compatibility of the antimicrobial agent with the system to be treated; the stability of the antimicrobial agent under storage conditions; toxicity; other environmental factors, or economic factors. The antimicrobial agent described desirably is a non-allergenic material with low human toxicity. The water-solubility of the antimicrobial agent is a desirable factor, but is not necessary in all embodiments, for example, when solvents other than water or suspensions of antimicrobial agents are employed. Mixtures of antimicrobial agents, including mixtures having synergistic activity, may also be used.

Accordingly, in an aspect, the antimicrobial agent includes at least a bismuth-containing compound, preferably an inorganic bismuth compound, more preferably multivalent bismuth salts of various anions, and most preferably an inorganic bismuth salt of a metal oxyanion. These compounds include their anhydrous forms as well as various hydrates, including hemihydrate, pentahydrate, and other hydrated forms, along with mixtures and combinations thereof, and the like.

Suitable examples of such bismuth salts of various anions include, without limitation, bismuth silicate, bismuth magnesium aluminosilicate, bismuth aluminate, bismuth borate, bismuth manganate, bismuth phosphate, and the like. In a preferred aspect, the inorganic bismuth-containing compound is a bismuth salt of a metal oxyanion, such as, for example, bismuth aluminate, bismuth manganate, and mixtures or combinations thereof, and the like. For illustration purposes, a chemical structure of a preferred bismuth aluminate is as follows:

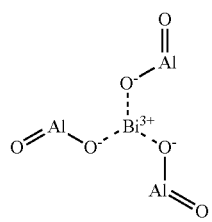

In some embodiments, the inorganic bismuth-containing compound may be used with one or more organic bismuth-containing compounds, including, for example, bismuth subcarbonate, bismuth subcitrate, bismuth citrate, bismuth titrate, bismuth gallate, bismuth subgallate, bismuth salicylate, bismuth subsalicylate, and the like, for example. The inorganic bismuth-containing compound may be used with one or more other inorganic bismuth-containing compounds, e.g. bismuth compounds that are not metal oxyanions of bismuth. Suitable examples of such compounds include, without limitation, bismuth hydroxide, bismuth trioxide, bismuth nitrate, bismuth subnitrate, and the like, and mixtures or combinations thereof.

Many inorganic compounds are considered difficult to use as antibacterial agents and many have serious drawbacks including environmental toxicity and cost. Surprisingly, an inorganic bismuth compound, such as bismuth aluminate, demonstrates effective antimicrobial activity when used in a locus, is relatively inexpensive, and is not toxic to the environment.

Moreover, many conventional biocide or biosurfactant systems currently used with coating compositions, finishes or colorants are used primarily to reduce or inhibit biofilm formation, e.g. sessile microorganism contamination where the microorganisms become attached to parts or substrates to which the composition is applied. In contrast, the disclosed antimicrobial agent may be used to treat both sessile microorganism contamination as well as contamination caused by freely moving microorganisms, i.e. motile microorganism contamination.

In various aspects, the locus may be present as a coating, coating intermediate, finish, or finish intermediate. Non-limiting examples of such loci include a paint, varnish, colorant, dispersion, lacquer, sealer, thinner, stain, glaze, primer, caulk, sealants, reducer, coalescent, reactive diluent, solvent, paste, filler, adhesive, carrier or a combination thereof. In certain embodiments, a coating or finish composition generally include a film forming resin or binder, optionally, a curing or crosslinking agent for the resin, and optionally one or more pigments. Colorants may include dispersions with a carrier and at least one pigment.

In coatings, coating intermediates, finishes and finish intermediates, the locus may employ a binder resin selected from any resin component or combination of resin components that provide desired film properties. Non-limiting examples of polymeric binders include thermoset materials, thermoplastic materials, or both and can be made from epoxy, polyester, polyurethane, polyamide, acrylic, polyvinylchloride, nylon, fluoropolymer, silicone, and other resins, or combinations thereof. Acrylics, epoxies, polyurethanes and polyesters are particularly preferred.

Certain embodiments of a coating, coating intermediate, finish or finish intermediate may include a curing or crosslinking agent for the film forming resin or binder. The selection of a particular crosslinking agent may depend upon the functional groups present in the film forming resin. Non-limiting examples of crosslinking agents include those having amine-functional groups, imine-functional groups, hydroxyl-functional groups, carboxyl-functional groups, epoxy-functional groups, or isocyanate functional groups.

In an aspect, the locus may include one or more pigment components, including pigments or fillers used to tone or opacify the coating or finish. Suitable examples of pigments include, without limitation, titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violet, DNA orange, and/or organic yellows (such as Hansa yellow), for example.

In addition to at least one binder resin, the locus may include one or more additives. Suitable additives include, without limitation, fillers, polymers, thixotropes, rheological modifiers, matting agents, pigment, additive, surfactant, emulsifier, dispersant, microbicide, thickener and the like. The additives may include one or more ingredients added to a locus to modify the properties or enhance performance during storage, handling, application and other or subsequent stages. Desirable performance characteristics of a coating or finish include, for example, chemical resistance, corrosion resistance, microbe resistance, abrasion resistance, tack resistance, hardness, gloss, reflectivity, extended shelf life, appearance and/or a combination of such properties and similar other properties. Preferred performance-enhancing additives include lacquers, waxes, flatting agents, antimicrobial agents, additives to prevent mar, abrasion, and the like.

In an embodiment, the inorganic bismuth-containing compound may be present in a locus in an amount sufficient to provide a biostatic or biocidal effect, depending on the condition of the intended application, the extent of contamination, and the like. In an aspect, the inorganic bismuth-containing compound may be present in an amount of at least about 0.001 wt %, 0.2 wt %, 0.3 wt %, 0.5 wt % and up to 1 wt % to about 2 wt %, 5 wt %, 8 wt %, 10.0 wt % or 20 wt % based on the total weight of the locus. If the inorganic bismuth-containing compound is used in conjunction with an organic bismuth-containing compound, a microbicide or other catalyst, the inorganic bismuth-containing compound may be present in an amount of at least about 0.025 wt %, 0.05 wt %, or 0.075 wt % and up to about 0.5 wt %, 1 wt %, 2 wt % or about 5 wt %, based on the total weight of resin solids in the locus.

Colorants are yet another potential locus that may employ an effective amount of an antimicrobial agent. Colorants are often utilized to enable the point-of-sale creation of coatings and finishes. Preferably, the colorant is substantially free of film-forming polymeric binders and more preferably, the colorant does not contain film-forming polymeric binders.

Embodiments may include colorants that can be in the form of a dispersion or a solid composition. In one aspect, a colorant is a concentrated stable dispersion used in the manufacture of fluid colorants or finished coatings (e.g., paints), wherein at least 95 wt. % of the concentrate is a mixture of (i) solid pigment particles, (ii) a liquid diluent, preferably a nonvolatilizing liquid diluent, and (iii) the inorganic bismuth-containing compound of this disclosure. Additionally, in some embodiments, one or more conventional wetting agents or dispersing agents typically will be employed to promote particle dispersion and separation, discourage particle agglomeration, and reduce the time required to mix the pigment or colorant with the base coating composition.

The amount of solid pigment particles in the disclosed colorant is best expressed by referring to volume percent pigment rather than weight percent pigment, owing to differences in density among the various pigments that typically will be employed. The pigment amount typically will also depend on the chosen pigment, owing to differences in particle size and color strength among available pigments. As a general rule, however, a colorant will contain a greater concentration (for example at least twice the concentration expressed on a volume percent pigment basis) compared to the highest concentration of such pigment normally present in a finished coatings. A non-limiting example of colorants includes those disclosed in PCT Published Application WO 2016/161387, herein incorporated by reference in its entirety. Exemplary pigment amounts for colorants are for example at least about 2, at least about 4, at least about 6, at least about 8, at least about 10 or at least about 12 vol. % pigment, and up to about 60, up to about 50, up to about 40, up to about 30, up to about 25 or up to about 20 vol. % pigment.

The amount of inorganic bismuth-containing compound in the colorant is sufficient to impart microbe resistance to the colorant. The inorganic bismuth-containing compound may be present in an amount of at least about 0.001 wt %, 0.2 wt %, 0.3 wt %, 0.5 wt % and up to 1 wt % to about 2 wt %, 5 wt %, 8 wt %, 10.0 wt % or 20 wt % based on the total weight locus.

In certain embodiments, the inorganic bismuth-containing compound can preferably function as an extender in the colorant. Conventional colorants often employ extenders such as talc, barium sulfate, calcium carbonate and others as adjuvants to reduce the amount of costly pigments in the colorant. In addition to imparting microbe-resistance, the incorporation of inorganic bismuth-containing compounds may reduce or eliminate the need to add other adjuvants to the colorant.

In other embodiments, the colorant may take the form of a solid composition. A such, the inorganic bismuth-containing compound may be incorporated into the solid colorant. A non-limiting example of solid colorants used in tinting paint and coating compositions includes those described in PCT Published Application No.: WO2015165994, herein incorporated by reference in its entirety.

Various techniques have been used in the industry to prevent or reduce microbial growth in process equipment and storage vessels. Physical removal methods such as powerwashing, for example, have been used. Chemical methods such as the use of biocides, halogenated compounds, and metal-containing compounds are also known. However, these methods suffer from several disadvantages. They are often expensive and labor-intensive, and some chemicals used to reduce or prevent microbial contamination may be toxic. Environmental concerns over releasing toxic chemicals into the air or wastewater streams also militate against use of such chemicals.

In one embodiment, the present description provides a method for imparting microbe-resistance to a locus, such as process equipment or storage vessels. Non-limiting examples of process equipment of storage vessel include a tank, pump, mixer, piping, can, container, tube, or bottle. The method may prevent, reduce or eliminate microbial contamination in a locus without releasing toxic chemicals into the air or wastewater streams and without using expensive and labor-intensive techniques or materials. In certain embodiments, the method provides an effective amount of an inorganic bismuth-containing antimicrobial agent that may be introduced to the locus. In an aspect, the antimicrobial agent may be introduced to the locus prior to or during use.

In an embodiment, the antimicrobial agent may be added directly to any part of the locus. This can for example encompass tanks, pipes, conveyors, monorails, sprayers, walls, post-rinse systems, and the like. In an embodiment, the antimicrobial agent may be incorporated into a solution that can be added directly to, or is part of, a locus. In another embodiment, the concentration of the antimicrobial agent in solution may be sufficient to reduce or eliminate microbial contamination in a locus. Depending on the type of surface or equipment of a locus that needs to be treated, the delivery method for the antimicrobial agent can be adjusted accordingly. In contrast to typical antimicrobial treatment systems, the disclosed inorganic bismuth-containing compound in some embodiments may be added directly to any part of a composition conveyed or placed in process equipment or storage vessels.

Accordingly, in an aspect, the antimicrobial agent described herein can be provided in concentrated form prior to addition to a liquid supply or stream. For example, the antimicrobial agent can be significantly more concentrated than the concentration level required for treatment of the locus. In an aspect, the agent may be provided at about 3 to about 5 times greater concentration than the concentration generally required.

In certain embodiments, the antimicrobial agent may be used in combination with conventional cleaning or preventative techniques, such as pressure washing, use of biocides, and manual scrubbing. Biocides can provide a synergistic effect when used in conjunction with the antimicrobial agent, as a biocide may destroy and possibly eliminate a targeted species of microorganism. The antimicrobial agent may be circulated through a process before a biocide is added to the process, for example. In an exemplary method, the antimicrobial agent can be applied and used in the locus, such as process equipment or storage vessels, about 15 to about 60 minutes before, during or after adding a biocide to the process.

To determine the effectiveness of the antimicrobial agent, it is useful to determine microorganism levels at least before the treatment, and preferably before and after implementing a treatment. A variety of methods and devices for monitoring and detecting levels and presence of microorganisms in a sample are known in the art, and any of these methods or devices may be used with the disclosed antimicrobial agent.

Preferably, significant decreases in contamination may be achieved in short time, e.g. less than about 24 hours to reduce or even eliminate microbial contamination. However, variations may exist in the effectiveness of the treatment or length of time required to achieve a desired reduction in contamination, depending on how severe the contamination was at the start of the cleaning process.

In a preferred embodiment, the antimicrobial agent or method may result in sustained elimination or decreased levels of microorganisms in the process equipment or the storage vessel for at least one week or more of continuous operating time. If relatively heavy contamination reappears and is detected within a short period, such as less than one week, one or more subsequent additions of the antimicrobial agent may reduce or eliminate the reappeared contamination.

The antimicrobial agent may be used as part of a preventive maintenance plan. Repeated, or intermittently scheduled treatments such as in a preventive maintenance schedule, can also be useful, particularly in heavily contaminated areas or areas that are prone to such contamination.

It is contemplated that various embodiments may include an inorganic bismuth-containing compound dispersed in a solution. The inorganic bismuth-containing compound may be present in an amount sufficient to either kill motile microorganisms or break down the adherence between sessile microorganisms within the locus. A solution of the antimicrobial agent may be added directly to any portion of the locus, including directly to any liquid stream that passes through or is maintained in the process, or it may be used as a direct cleaning solution.

The incorporation and use of an the inorganic bismuth-containing compound may enhance a coating, coating intermediate, finish, finish intermediate or colorant by reducing or eliminating the amount of conventional antimicrobial agents and biocides, such as isothiazoline, cyclopentane, bronopol, formaldehyde, mercury, and others common to certain coatings, finishes and colorants. In some embodiments, the coating, coating intermediate, finish, finish intermediate or colorant is substantially free, and preferably essentially free of isothiazoline, cyclopentane, bronopol, formaldehyde, or mercury.

In certain aspects the disclosed a coating, coating intermediate, finish, finish intermediate or colorant incorporating the inorganic bismuth-containing compound may exhibit microbial resistance after one week up to twelve weeks aging at temperature ranges from about 100 F (37° C.) to about 140° F. (60° C.), in accordance with ASTM D 2574.

The coatings, coating intermediates, finishes, finish intermediates, and colorants incorporating the antimicrobial agent may be used in wide variety of applications. Non-limiting examples include: architectural coatings, packaging coatings, wood coatings, wood finish, industrial coatings, automotive coatings, plastic coatings, electronic coatings and agricultural finishes. The use of the disclosed antimicrobial agent prevents, reduces or eliminates microbial growth without adversely impacting health safety or environmental concerns. Preferably, the locus incorporating the inorganic bismuth-containing compound is free of any health hazard warnings under the Globally Harmonized System of classification and labelling of chemicals.

Examples

The invention is illustrated by the following examples. It is to be understood that the particular examples, materials, amounts, and procedures are to be interpreted broadly in accordance with the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were utilized in the Examples that follow.

ASTM D 2574: Standard Test for Resistance of Emulsion Paints in the Container to Attack by Microorganisms.

The test is conducted in accordance with the ASTM standard, except for the following modifications noted for the preparation of the inoculum and test procedure.

Preparation of Inoculum: There are 7 bacteria used in forming the challenge pool, they include: *P. aeruginosa* (ATCC #10145), *E. aerogenes* (ATCC #13048), *E. coli* (ATCC #10536), *K. pneumonia* (ATCC #10031), *S. aureus* (ATCC #6538), *B. subtilis* (ATCC #6051) and *S. enterica* (ATCC #13312). Bacterial cultures are prepared 24 hours before the test is scheduled to start by selecting one colony from a plate with a 104, inoculating loop, adding it to 10 mL of sterile tryptic soy broth tubes and placing it on the shaking incubator. A 1 mL of each of the seven organisms is combined into a pool in a conical tube. A 1 mL of the created pool is then added to a 9 mL of sterile tryptic soy broth in a conical tube to get an inoculum concentration of $\sim 10^8$ CFU/mL.

Test Procedure: A 1:100 dilution of the inoculum is added into each sample (ex. 4004, into 40 mL of sample) which provides a $\sim 10^6$ CFU/mL challenge. The samples are then placed into 35° C. incubator for 24 hours to grow new organisms before each inoculation. The samples are inoculated on Days: 0, 2, 7 and 14. The samples are put back into incubator after each inoculation. In order to check for contamination, each sample is streaked onto a sterile soy agar plate and incubated for the intended cycle. The bacterial growth on the plates is observed and reported according to a standard. The standard is as follows: A rating of "0" indicates no bacterial recovery, "1" indicates trace contamination (1 to 9 colonies), "2" indicates light contamination (10 to 99 colonies), "3" indicates moderate contamination (>100 distinct colonies), and "4" indicates heavy contamination (colonies have grown together and are indistinguishable). The cycles and the temperatures at which each sample is incubated may be varied to stress the system. All variations, if applicable, are noted in the description and reported results.

ASTM E 2315: Standard Guide for Assessment of Antimicrobial Activity Using a Time-Kill Procedure.

This test procedure is useful in determining the potential of a compound as a sanitizer. The duration of the test is relatively short and offers an effective way to measure the biocidal potential of a liquid antimicrobial formulation.

A microbial culture is prepared in a manner similar to that of ASTM 2574. Equal volumes of the test product are placed in sufficient sterile test vessels. A volume of microbial culture (usually 1/10 of the product volume) is placed in the test vessel and then immediately mixed. For purposes of this disclosure contact times and measurements were made every hour for the first 12 hours, with two final measurements made at 24 hours and 7 days. To measure initial microbial concentrations, a saline control vessel is spiked with the same microbial culture and then enumerated. The results are reported using the same standard as ASTM D 2574.

EXAMPLES

Example 1 and Comparative Example 1

For Example 1 and Comparative Example 1, colorant dispersions were created using the raw materials listed in Table 1 at the noted weight percentages. Specifically, the ingredients were mixed and then milled until the pigment particles reached a Hegman grind of about 7. Each example was subjected to ASTM D 2574 and modified as indicated above. Each cycle corresponds to one additional week. The results are reported in Table 2. Comparative Example 1 exhibited heavy bacterial growth after 1 day. Example 1 containing bismuth aluminate did not exhibit bacterial growth.

TABLE 1

|  | % | |
| --- | --- | --- |
|  | CE1 | 1 |
| Humectant | 4.13 | 4.13 |
| Water | 72.15 | 67.15 |
| Defoamer | 0.83 | 0.83 |
| Bismuth Aluminate | 0 | 5.00 |
| Surfactant | 3.36 | 3.36 |
| Dispersant | 4.36 | 4.36 |
| Pigment Red 122 | 15.17 | 15.17 |
|  | 100 | 100 |

TABLE 2

|  | Cycle 1 | | Cycle 2 | | Cycle 3 | | Cycle 4 | |
| --- | --- | --- | --- | --- | --- | --- | --- | --- |
| # | Day 1 | Day 2 | Day 1 | Day 4 | Day 1 | Day 6 | Day 1 | Day 6 | Day 13 |
| CE1 | 4 | 4 | 4 | 4 | 4 | 4 | 4 | 4 | 4 |
| 1 | 0 | 0 | 0 | 0 | 0 | 0 | 0 | 0 | 0 |

Example 2 and Comparative Examples 2 and 3

Pigment dispersions for Comparative Examples 1 and 2 and Example 2 were prepared using the same procedure as Example 1. Example 2 incorporated 5 wt % of bismuth aluminate. Comparative Example 2 did not include any antimicrobial agent. Comparative Example 3 utilized isothiazolone as an antimicrobial agent. Table 3 lists all of the components used in forming the pigment dispersions. Incubation and aging of each example under ASTM D 2574 was conducted by aging split samples. The samples were split into thirds with one designated room temperature, one for 3 weeks at 60° C. and the other for 6 weeks at 60° C. Initial results indicated that bismuth aluminate and the isothiazolone preservatives were effective in preventing microbial growth. The results are shown in Table 4. The inorganic bismuth compound was at least as effective as the isothiazolone antimicrobial agent.

TABLE 3

|  | % | | |
| --- | --- | --- | --- |
|  | CE2 | CE3 | 2 |
| Humectant | 4.23 | 4.23 | 4.23 |
| Water | 45.94 | 45.73 | 40.94 |
| Amine | 0.20 | 0.20 | 0.20 |
| Defoamer | 0.55 | 0.55 | 0.55 |
| Isothiazolone preservative | — | 0.21 | — |
| Fungicide | 0.12 | 0.12 | 0.12 |
| Bismuth Aluminate | — | — | 5.00 |
| Surfactant | 7.71 | 7.71 | 7.71 |
| Dispersant | 8.94 | 8.94 | 8.94 |
| Pigment Yellow 74 | 32.31 | 32.31 | 32.31 |
|  | 100 | 100 | 100 |

TABLE 4

|  |  | Cycle 1 | | | Cycle 2 | | | Cycle 3 | | | Cycle 4 | | |
| --- | --- | --- | --- | --- | --- | --- | --- | --- | --- | --- | --- | --- | --- |
| # |  | Day 1 | Day 2 |  | Day 1 | Day 4 |  | Day 1 | Day 6 |  | Day 1 (T-15) | Day 6 (T-20) | Day 13 (T-27) |
| CE2 | Challenge | 4 | 4 | Challenge | 4 | 4 | Challenge | 4 | 4 | Challenge | 4 | | |
| CE3 | 1 @ 10⁶ | 0 | 0 | 1 @ 10⁶ | 0 | 0 | 1 @ 10⁶ | 2 | 0 | 1 @ 10⁶ | 2 | | |
| 2 | CFU/mL | 0 | 0 | CFU/mL | 0 | 0 | CFU/mL | 0 | 0 | CFU/mL | 1 | | |

Examples 3 through 6 and Comparative Example 4. To demonstrate the anti-microbial effect and sanitizing efficacy of bismuth containing compounds in a liquid medium such as a latex paint, varying levels of bismuth aluminate at 0.01 wt %, 0.1 wt %, 1 wt % and 5 wt % are added to water and tested according to ASTM E 2315. A comparative example without antimicrobial agent is included as a control. The anticipated results are listed in Table 5.

TABLE 5

| # | Amount of Bismuth Aluminate | Cycle 1 | | | | | | | | | | | | | |
|---|---|---|---|---|---|---|---|---|---|---|---|---|---|---|---|
| | | 1 hr | 2 hr | 3 hr | 4 hr | 5 hr | 6 hr | 7 hr | 8 hr | 9 hr | 10 hr | 11 hr | 12 hr | 24 hr | 7 day |
| 3 | .01% in H2O Challenge | 4 | 4 | 4 | 4 | 4 | 4 | 4 | 4 | 4 | 4 | 4 | 4 | 1 | 0 |
| 4 | 0.1% in H2O 1 @ 10⁶ | 4 | 4 | 4 | 4 | 4 | 4 | 3 | 3 | 2 | 1 | 1 | 1 | 0 | 0 |
| 5 | 1% in H2O CFU/mL | 4 | 4 | 3 | 3 | 2 | 1 | 1 | 1 | 1 | 1 | 0 | 0 | 0 | 0 |
| 6 | 5% in H2O | 3 | 2 | 1 | 0 | 0 | 0 | 0 | 0 | 0 | 0 | 0 | 0 | 0 | 0 |
| CE4 | H2O Control | 4 | 4 | 4 | 4 | 4 | 4 | 4 | 4 | 4 | 4 | 4 | 4 | 4 | 4 |

Example 7 and Comparative Example 5: Process Equipment: Two identical 45 liter Premier horizontal media mills are sanitized and prepared for processing. On mill #1, 250 gallons aqueous phthalo green liquid colorant essentially free of bacterial preservative agents is processed. On mill #2, 250 gallons aqueous phthalo green liquid colorant containing 10 wt % bismuth aluminate is processed. Upon process completion, each mill is flushed with 30 gallons clean tap water, and then purged with nitrogen. Aliquots of the residual liquid are obtained from each mill and subjected to ASTM D 2574 as described under the Test Methods. The anticipated results are listed in Table 6.

TABLE 6

| | Cycle 1 | | Cycle 2 | | Cycle 3 | | Cycle 4 | | |
|---|---|---|---|---|---|---|---|---|---|
| # | Day 1 | Day 2 | Day 1 | Day 4 | Day 1 | Day 6 | Day 1 | Day 6 | Day 13 |
| CE5 | 4 | 4 | 4 | 4 | 4 | 4 | 4 | 4 | 4 |
| 7 | 0 | 0 | 0 | 0 | 0 | 0 | 0 | 0 | 0 |

Example 8 and Comparative Example 6: Two identical 2500 gallon mixing tanks are sanitized and prepared for processing. In tank #1, 2000 gallons aqueous latex emulsion paint essentially free of bacterial preservative agents is processed. In tank #2, 2000 gallons aqueous latex emulsion paint containing 5 wt % bismuth aluminate is processed. Upon process completion, each tank is rinsed with 30 gallons clean tap water, and then drained. Aliquots of the residual liquid are obtained from each tank and subjected to the ASTM D 2574 as described under the Test Methods. The anticipated results are listed in Table 7.

TABLE 7

| | Cycle 1 | | Cycle 2 | | Cycle 3 | | Cycle 4 | | |
|---|---|---|---|---|---|---|---|---|---|
| # | Day 1 | Day 2 | Day 1 | Day 4 | Day 1 | Day 6 | Day 1 | Day 6 | Day 13 |
| CE6 | 4 | 4 | 4 | 4 | 4 | 4 | 4 | 4 | 4 |
| 8 | 0 | 0 | 0 | 0 | 0 | 0 | 0 | 0 | 0 |

Examples 9-11 and Comparative Example 7. In Examples 9-11 and CE7, a white latex paint was created utilizing the components of Table 8. A dispersion was created by combining and stirring the solid components, including the bismuth aluminate, in water along with the amine and the coalescent. The dispersion was then let down into a solution of the remaining components and stirred to create about 3.7 L of white paint. A microbial culture was prepared in a manner similar to that of ASTM 2574. Equal volumes of the test product were placed in sufficient sterile test vessels. A volume of microbial culture (usually ¹/₁₀ of the product volume) was placed in the test vessel and then immediately mixed. For purposes of Examples 9-11 and CE7, contact times and measurements were made every hour for the first 12 hours, with two final measurements made at 24 hours and 7 days. The results are reported in Table 9.

Examples 12-14 and Comparative Example 8. In Examples 12-14 and CE8, a clear base paint was created utilizing the components of Table 8. A dispersion was created by combining and stirring the solid components, including the bismuth aluminate, in water along with the amine and the coalescent. The dispersion was then let down into a solution of the remaining components and stirred to create about 3.7 L of white paint. A microbial culture was prepared in a manner similar to that of ASTM 2574. Equal volumes of the test product were placed in sufficient sterile test vessels. A volume of microbial culture (usually ¹/₁₀ of the product volume) was placed in the test vessel and then immediately mixed. For purposes of Examples 12-14 and CE8, contact times and measurements were made every hour for the first 12 hours, with two final measurements made at 24 hours and 7 days. The results are reported in Table 9.

TABLE 8

| % | CE7 | 9 | 10 | 11 | CE8 | 12 | 13 | 14 |
|---|---|---|---|---|---|---|---|---|
| Water | 15.97 | 15.97 | 15.97 | 14.48 | 15.94 | 15.94 | 15.45 | 11.45 |
| Fungicide | 0.47 | 0.47 | 0.47 | 0.47 | 0.47 | 0.47 | 0.47 | 0.47 |
| Coalescent | 1.27 | 1.27 | 1.27 | 1.27 | 2 | 2 | 2 | 2 |
| Defoamer | 1.18 | 1.18 | 1.18 | 1.18 | 1.18 | 1.18 | 1.18 | 1.18 |
| Surfactant | 1.44 | 1.44 | 1.44 | 1.44 | 1.44 | 1.44 | 1.44 | 1.44 |
| Extender | 3.51 | 3.41 | 2.51 | — | 0.51 | 0.41 | — | — |
| Latex | 65.37 | 65.37 | 65.37 | 65.37 | 75 | 75 | 75 | 75 |
| Amine | 0.12 | 0.12 | 0.12 | 0.12 | 0.12 | 0.12 | 0.12 | 0.12 |
| Thickener | 1.98 | 1.98 | 1.98 | 1.98 | 3 | 3 | 3 | 3 |

TABLE 8-continued

| % | CE7 | 9 | 10 | 11 | CE8 | 12 | 13 | 14 |
|---|---|---|---|---|---|---|---|---|
| Surfactant | 0.34 | 0.34 | 0.34 | 0.34 | 0.34 | 0.34 | 0.34 | 0.34 |
| TiO$_2$ | 8.35 | 8.35 | 8.35 | 8.35 | — | — | — | — |
| Bismuth Aluminate | — | 0.1 | 1 | 5 | — | 0.1 | 1 | 5 |
|  | 100 | 100 | 100 | 100 | 100 | 100 | 100 | 100 |

TABLE 9

| # | | 1 hr | 2 hr | 3 hr | 4 hr | 5 hr | 6 hr | 7 hr | 8 hr | 9 hr | 10 hr | 11 hr | 12 hr | 24 hr | 7 day |
|---|---|---|---|---|---|---|---|---|---|---|---|---|---|---|---|
| | | | | | | | | Cycle 1 | | | | | | | |
| CE7 | Challenge | 4 | 4 | 4 | 4 | 4 | 4 | 4 | 4 | 4 | 4 | 4 | 4 | 0 | 0 |
| 9 | 1 @ 10$^6$ | 4 | 4 | 4 | 4 | 4 | 4 | 4 | 4 | 4 | 4 | 4 | 4 | 2 | 0 |
| 10 | CFU/mL | 4 | 4 | 4 | 4 | 4 | 4 | 4 | 4 | 4 | 4 | 4 | 4 | 0 | 0 |
| 11 | | 4 | 4 | 4 | 4 | 4 | 4 | 4 | 4 | 4 | 4 | 4 | 4 | 0 | 0 |
| CE8 | | 4 | 4 | 3 | 3 | 2 | 2 | 2 | 2 | 1 | 1 | 1 | 0 | 0 | 0 |
| 12 | | 4 | 4 | 4 | 4 | 4 | 4 | 4 | 4 | 4 | 4 | 4 | 4 | 0 | 0 |
| 13 | | 4 | 4 | 4 | 4 | 4 | 4 | 4 | 4 | 4 | 4 | 4 | 4 | 0 | 0 |
| 14 | | 4 | 4 | 4 | 4 | 4 | 4 | 4 | 4 | 4 | 4 | 4 | 4 | 0 | 0 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described and variations apparent to one skilled in the art may be included within the invention defined by the claims. The invention illustratively disclosed herein suitably may be practiced, in some embodiments, in the absence of any element, which is not specifically disclosed herein.

What is claimed is:

1. A method of imparting microbe-resistance to a locus, comprising:
    a) providing an effective amount of an antimicrobial agent consisting of bismuth aluminate; and
    b) introducing the antimicrobial agent to a locus to impart microbe-resistance, wherein the locus comprises a coating, coating intermediate, finish, finish intermediate, colorant, process equipment, storage vessel, paint, varnish, dispersion, lacquer, sealer, thinner, stain, glaze, primer, caulk, sealants, reducer, coalescent, reactive diluent, solvent, filler, adhesive, carrier or combination thereof;
    wherein bismuth aluminate is the only antimicrobial agent present in the locus.

2. The method of claim 1, wherein the bismuth-containing antimicrobial agent is in the form of a solid, paste, dispersion or solution.

3. The method of claim 1, wherein the carrier is a waterborne carrier or a solvent-borne carrier.

4. The method of claim 1, wherein the locus includes at least one component selected from the group consisting of: a polymer, filler, thixotrope, rheology modifier, matting agent, pigment, additive, surfactant, emulsifier, dispersant, and thickener.

5. The method of claim 1, wherein the process equipment or storage vessel comprise a tank, pump, mixer, piping, can, container, tube, or bottle.

6. The method of claim 1, wherein the locus initially exhibits microbial colonies and wherein the microbial population is reduced by at least one standard rating according to the scoring scale in ASTM D 2574.

7. The method of claim 1, wherein the locus includes about 0.001% to 20% by weight of bismuth aluminate.

8. The method of claim 1, wherein the bismuth-containing antimicrobial agent is added to a matrix as a granule or a powder.

9. The method of claim 1, wherein the colorant is a pigment dispersion.

10. The method of claim 1, wherein the locus is substantially free of isothiazolones, cyclopentane, bronopol, formaldehyde, or mercury.

11. The method of claim 1, wherein the bismuth-containing antimicrobial agent also serves as an extender.

12. The method of claim 1, wherein the locus exhibits no microbial growth after three weeks aging at 60° C. in accordance with ASTM D 2574.

13. A composition comprising a locus of a coating, coating intermediate, finish, finish intermediate, colorant, paint, varnish, dispersion, lacquer, sealer, thinner, stain, glaze, primer, caulk, sealants, reducer, coalescent, reactive diluent, solvent, filler, adhesive, carrier or combination thereof having an antimicrobial agent consisting of bismuth aluminate, wherein an effective amount of the antimicrobial agent is present in the locus, wherein bismuth aluminate is the only antimicrobial agent present in the locus.

14. The composition of claim 13, wherein the composition is capable of imparting microbe-resistance to storage equipment or a vessel.

* * * * *